US012442496B1

(12) United States Patent
Jin

(10) Patent No.: US 12,442,496 B1
(45) Date of Patent: Oct. 14, 2025

(54) CHRISTMAS LAMP

(71) Applicant: Linhai Daqi Lighting Technology Co., Ltd., Taizhou (CN)

(72) Inventor: Yang Jin, Taizhou (CN)

(73) Assignee: Linhai Daqi Lighting Technology Co., Ltd., Taizhou (CN)

( * ) Notice: Subject to any disclaimer, the term of this patent is extended or adjusted under 35 U.S.C. 154(b) by 0 days.

(21) Appl. No.: 18/957,547

(22) Filed: Nov. 22, 2024

(51) Int. Cl.
*F21S 4/15* (2016.01)
*F21V 21/08* (2006.01)
*F21V 23/00* (2015.01)

(52) U.S. Cl.
CPC ................ *F21S 4/15* (2016.01); *F21V 21/08* (2013.01); *F21V 23/003* (2013.01)

(58) Field of Classification Search
CPC ...... F21V 23/007; F21V 23/003; F21V 21/08; F21V 15/013; F21V 23/008; F21V 27/005; F21S 4/15; F21S 4/20; F21S 4/10; A47G 2033/0827
See application file for complete search history.

(56) References Cited

U.S. PATENT DOCUMENTS

| | | | | |
|---|---|---|---|---|
| 5,601,361 A * | 2/1997 | Lawrence | F21S 4/10 362/238 |
| 10,641,470 B1 * | 5/2020 | Smyth | F21V 21/0816 |
| 12,188,627 B1 * | 1/2025 | Su | F21V 17/108 |
| 2002/0105803 A1 * | 8/2002 | Deutsch | F21V 33/0016 362/370 |
| 2011/0076425 A1 * | 3/2011 | Cheng | F21S 4/10 428/8 |

FOREIGN PATENT DOCUMENTS

| | | | | |
|---|---|---|---|---|
| CN | 1243333 A | 2/2000 | |
| CN | 103634975 A | 3/2014 | |
| CN | 113099574 A | 7/2021 | |
| DE | 20214734 U1 * | 12/2002 | A47G 33/06 |
| EP | 1197704 A2 * | 4/2002 | F21S 4/15 |

OTHER PUBLICATIONS

Innovation Q+ NPL Search (Year: 2024).*

* cited by examiner

*Primary Examiner* — Anabel Ton

(57) ABSTRACT

A Christmas lamp is provided. A Christmas lamp that is provided with a light string controller and is in a shape catering to a festive atmosphere. A key point of a technical solution of the Christmas lamp is that a bottom supporting rod is arranged at a bottom of the Christmas lamp; the bottom supporting rod includes a concave rod piece and a storage box; the storage box is arranged in a notch of the concave rod piece and is fixedly connected to the concave rod piece; and the storage box is configured to store a light string controller. The Christmas lamp is applicable to the technical field of decorative lamps.

5 Claims, 2 Drawing Sheets

CHRISTMAS LAMP

TECHNICAL FIELD

The present disclosure relates to a Christmas lamp, and more particularly, to a Christmas lamp that is provided with a light string controller and is in a shape catering to a festive atmosphere.

BACKGROUND

A Christmas lamp is a decorative lamp, and the Christmas is a traditional festival for Westerners. At the Christmas, people always use various decorations to decorate their houses, which can create a festive atmosphere to better welcome the arrival of Christmas. The Christmas lamp, as a specialized decorative lamp for festivals, is a common product for decorating houses.

At present, there are various types of Christmas lamps on the market. The most common Christmas lamps have trees, and light strings are directly wrapped around the matched trees, or light strings at a factory are three-shaped and have other shapes that match the festive atmosphere. Although the technology of the Christmas lamps is relatively mature and the production costs are low, the Christmas lamps have single lighting modes, are used at a low frequency, and are oriented to limited customer groups.

SUMMARY

For the shortcomings in the prior art, the present disclosure aims to provide a Christmas lamp that is provided with a light string controller and is in a shape catering to a festive atmosphere.

To achieve the above objective, the present disclosure provides the following technical solution: A Christmas lamp includes a light string, a hook, several supporting rods, and a light string controller. The light string is detachably connected to the hook; a bottom supporting rod is arranged at a bottom of the Christmas lamp; the bottom supporting rod includes a concave rod piece and a storage box; the storage box is arranged in a notch of the concave rod piece and is fixedly connected to the concave rod piece; and the storage box is configured to store the light string controller.

By the use of the above technical solution, the Christmas lamp has the light string controller, so that a light-on mode of the Christmas lamp can be freely adjusted, and the Christmas lamp will not have a single lighting mode. The bottom supporting rod plays a role in supporting the light string controller, and further achieves a fixing effect on the entire structure.

In a further setting of the present disclosure, straight rods at two ends of the concave rod piece have equal lengths; a width of the storage box is the same as a height of the storage box; a ratio of the width of the storage box to a width of the concave rod piece is 1:5; an inside of the concave rod piece is of a hollow structure for allowing the light string to pass through; a hole is provided in a joint between the storage box and a bottom of the concave rod piece; and the hole communicates the hollow structure of the concave rod piece to the storage box. An end cover in slot connection with each supporting rod is arranged at each of two ends of the supporting rod; grooves are provided in the end covers; the light string passes through the various supporting rods via the grooves and is fixedly connected to the end covers of the various supporting rods; the various supporting rods are parallel to each other and have different lengths; the lengths of the various supporting rods gradually increase from top to bottom; the concave rod piece is located below the supporting rods; a length of the concave rod piece is greater than the length of each of the supporting rods; the light string enters the concave rod piece from two ends of the concave rod piece, and is exposed out of the storage box and connected to the light string controller, so that the light string, the supporting rods, and the concave rod piece are overall located on the same plane; and the light string and the concave rod piece form a shape of a Christmas trees.

By the use of the above technical solution, the storage box is overall square, which is located at a center position of the overall contour. The light string, the supporting rods, the hook, and the concave rod piece make the overall contour of the Christmas lamp more in line with a tree shape. Due to the supporting rods and the concave rod piece of the Christmas lamp, the entire lamp body will not rock easily. Even if the lamp rocks, the lamp will be reset under a connection action between the light string and the supporting rods. The light string is connected to the light string controller through the inside of the concave rod piece, so that the entire Christmas lamp is attractive.

In a further setting of the present disclosure, a gap is provided in an outer side of the storage box; the light string controller is provided with a button for controlling turning on and turning off of a light string; and the button is exposed out of the storage box through the gap.

By the use of the above technical solution, the gap is provided in the storage box for placing the light string controller to provide an opening for turning on and turning off of the light string controller, so that the light string controller is used to control the Christmas lamp during use.

In a further setting of the present disclosure, the supporting rods and the bottom supporting rod are both made of plastic materials.

By the use of the above technical solution, the supporting rods and the bottom supporting rod are both made of the plastic materials, so that the cost of the Christmas lamp is not too high. Furthermore, the plastic material is lighter in weight, which will not cause high pressure on the light string of the Christmas lamp.

NUMERALS IN THE ACCOMPANYING DRAWINGS

1: concave rod piece; 2: storage box; 3: supporting rod; 4: light string controller; and 5: end cover; 6: hook; 7: light string.

DETAILED DESCRIPTION OF THE EMBODIMENTS

Figure 1:
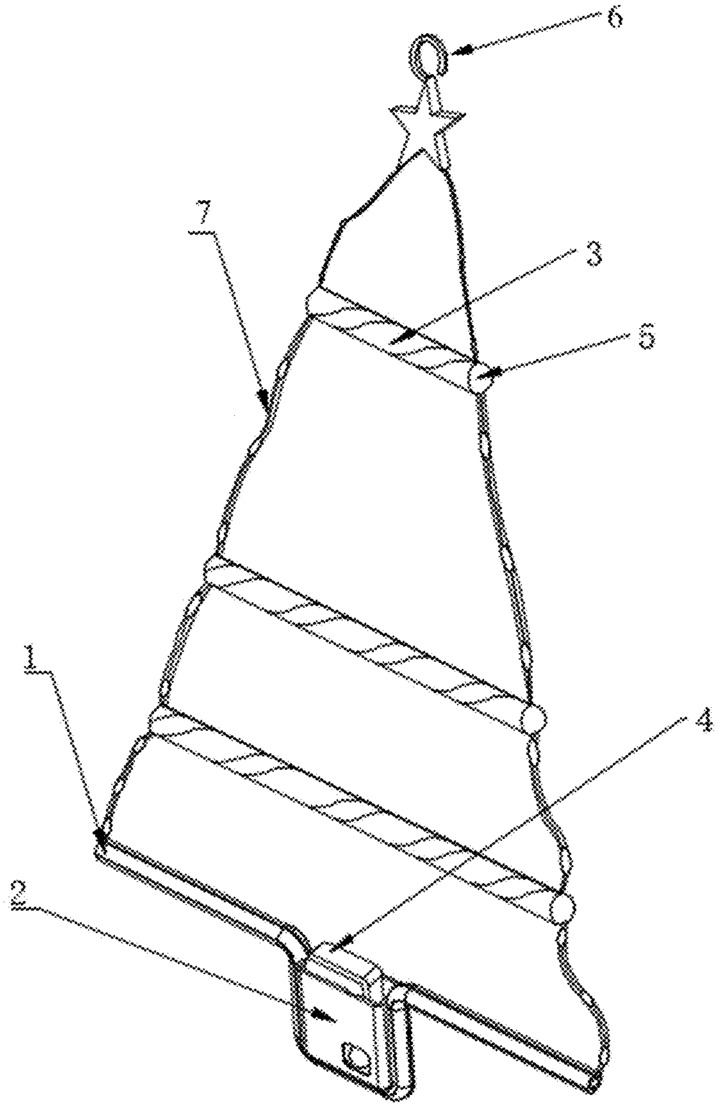
FIG. 1 is a structural diagram of an embodiment of a Christmas lamp of the present disclosure.
Figure 2:
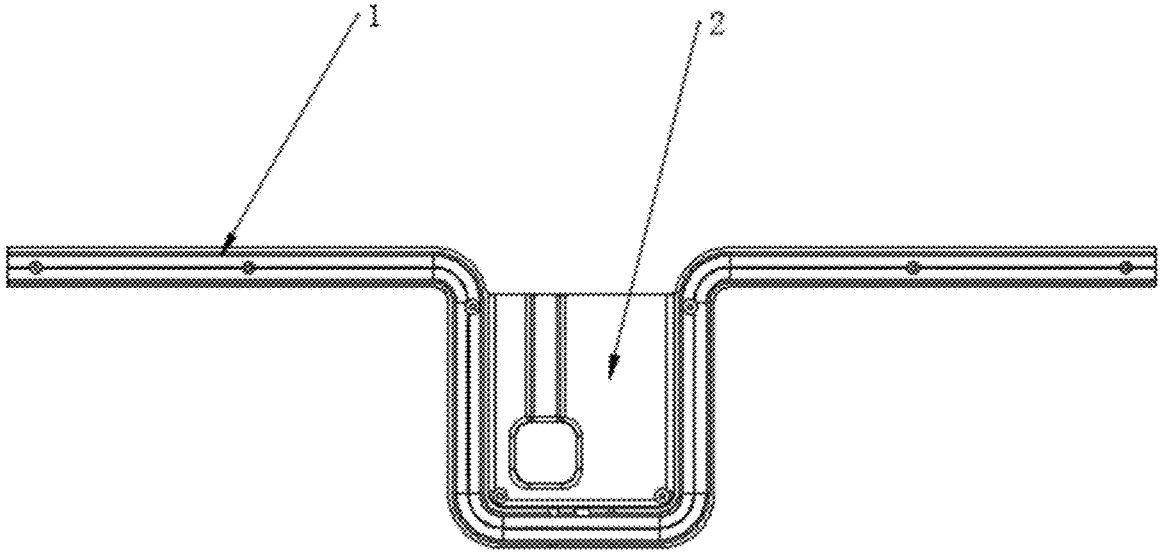
FIG. 2 is a sectional view of a bottom supporting rod.

Referring to FIG. 1 to FIG. 2, a further explanation will be made to the embodiment of a Christmas lamp according to the present disclosure.

For ease of explanation, spatial relative terms such as "up", "down", "left", and "right" are used in the embodiments to illustrate a relationship between one element or feature shown in the figures and another element or feature. It should be understood that in addition to the orientations shown in the figures, the spatial terms are intended to include different orientations of a device during use or operation. For example, if the device in the figures is placed upside down, an element described as being located "below" another element or feature will be positioned as being "above" the another element or feature. Therefore, the exemplary term "down" can include both up and down orientations. The device can be positioned in other ways (rotated 90 degrees or in other orientations), and the spatial relative explanations used here can be explained correspondingly.

Moreover, relational terms such as "first" and "second" are only used to distinguish one component from another with the same name, without necessarily requiring or implying any actual relationship or order between these components.

A Christmas lamp includes alight string 7, a hook 6, several supporting rods 3, and light string controller 4. The light string 7 is detachably connected to the hook 6. A bottom supporting rod is arranged at a bottom of the Christmas lamp. The bottom supporting rod includes a concave rod piece 1 and a storage box 2. The storage box 2 is arranged in a notch of the concave rod piece 1 and is fixedly connected to the concave rod piece 1. The storage box 2 is configured to store the light string controller 4. By the use of the technical solution, the Christmas lamp has the light string controller 4, so that a light-on mode of the Christmas lamp can be freely adjusted, and the Christmas lamp will not have a single lighting mode. The bottom supporting rod plays a role in supporting the light string controller 4, and further achieves a fixing effect on the entire structure.

Further, straight rods at two ends of the concave rod piece 1 have equal lengths; a width of the storage box 2 is the same as a height of the storage box 2; a ratio of the width of the storage box 2 to a width of the concave rod piece 1 is 1:5; an inside of the concave rod piece 1 is of a hollow structure for allowing the light string to pass through; a hole is provided in a joint between the storage box 2 and a bottom of the concave rod piece 1; and the hole communicates the hollow structure of the concave rod piece 1 to the storage box 2. An end cover 5 in slot connection with each supporting rod 3 is arranged at each of two ends of the supporting rod 3; grooves are provided in the end covers 5; the light string passes through the various supporting rods via the grooves and is fixedly connected to the end covers 5 of the various supporting rods; the various supporting rods 3 are parallel to each other and have different lengths; the lengths of the various supporting rods 3 gradually increase from top to bottom; the concave rod piece 1 is located below the supporting rods 3; a length of the concave rod piece 1 is greater than the length of each of the supporting rods 3; the light string enters the concave rod piece 1 from two ends of the concave rod piece 1, and is exposed out of the storage box 2 and connected to the light string controller 1, so that the light string, the supporting rods 3, and the concave rod piece 1 are overall located on the same plane; and the light string and the concave rod piece 1 form a shape of a Christmas trees. By the use of the above technical solution, the storage box 2 is square, which is located at a center position of the overall contour. The light string, the supporting rods 3, the hook, and the concave rod piece 1 make the overall contour of the Christmas lamp more in line with a tree shape. Due to the supporting rods 3 and the concave rod piece 1 of the Christmas tree, the entire lamp body will not rock easily. Even if the lamp rocks, the lamp will be reset under a connection action between the light string and the supporting rods 3. The light string is communicated to the light string controller 4 through the inside of the concave rod piece 1, so that the entire Christmas lamp is attractive. Meanwhile, the connection between the light string and the concave rod piece 1 is stable.

Further, a gap is provided in an outer side of the storage box 2; the light string controller 4 is provided with a button for controlling turning on and turning off of a light string; and the button is exposed out of the storage box 2 through the gap. By the use of the above technical solution, the gap is provided in the storage box 2 for placing the light string controller 4 to provide an opening for turning on and turning off of the light string controller 4, so that the light string controller 4 is used to control the Christmas lamp during use.

Further, the supporting rods 3 and the bottom supporting rod are both made of plastic materials. By the use of the above technical solution, the supporting rods 3 and the bottom supporting rod which are made of the plastic materials are used, so that the cost of the Christmas lamp is not too high. Furthermore, the plastic material is lighter in weight, which will not cause high pressure on the light string of the Christmas lamp.

The above-mentioned embodiments are only preferred embodiments of the present disclosure and are not intended to limit the present disclosure, and the usual changes and substitutions made by those skilled in the art within the scopes of the technical solutions of the present disclosure shall fall within the protection scope of the present disclosure.

What is claimed is:

1. A Christmas lamp, comprising a light string (7), a hook (6), several supporting rods (3), and a light string controller (4), wherein the light string (7) is detachably connected to the hook (6); a bottom supporting rod is arranged at a bottom of the Christmas lamp; the bottom supporting rod comprises a concave rod piece (1) and a storage box (2); the storage box (2) is arranged in a notch of the concave rod piece (1) and is fixedly connected to the concave rod piece (1); and the storage box (2) is configured to store the light string controller (4).

2. The Christmas lamp according to claim 1, wherein straight rods at two ends of the concave rod piece (1) have equal lengths; a width of the storage box (2) is the same as a height of the storage box (2); a ratio of the width of the storage box (2) to a width of the concave rod piece (1) is 1:5; an inside of the concave rod piece (1) is of a hollow structure for allowing the light string (7) to pass through; a hole is provided in a joint between the storage box (2) and a bottom of the concave rod piece (1); and the hole communicates the hollow structure of the concave rod piece (1) to the storage box (2).

3. The Christmas lamp according to claim 2, wherein an end cover (5) in slot connection with each supporting rod (3) is arranged at each of two ends of the supporting rod (3); grooves are provided in the end covers (5); the light string (7) passes through the various supporting rods via the grooves and is fixedly connected to the end covers (5) of the various supporting rods; the various supporting rods (3) are parallel to each other and have different lengths; the lengths of the various supporting rods (3) gradually increase from top to bottom; the concave rod piece (1) is located below the supporting rods (3); a length of the concave rod piece (1) is greater than the length of each of the supporting rods (3); the light string (7) enters the concave rod piece (1) from two ends of the concave rod piece (1), and is exposed out of the storage box (2) and connected to the light string controller (4), so that the light string (7), the supporting rods (3), and the concave rod piece (1) are overall located on the same plane; and the light string (7) and the concave rod piece (1) form a shape of a Christmas trees.

4. The Christmas lamp according to claim 1, wherein a gap is provided in an outer side of the storage box (2); the light string controller (4) is provided with a button for controlling turning on and turning off of the light string (7); and the button is exposed out of the storage box (2) through the gap.

5. The Christmas lamp according to claim 1, wherein the supporting rods (3) and the bottom supporting rod are both made of plastic materials.

* * * * *